(12) United States Patent
Hori

(10) Patent No.: US 6,771,582 B1
(45) Date of Patent: Aug. 3, 2004

(54) CONTROL DIAL AND OPTICAL DISK APPARATUS HAVING THE CONTROL DIAL

(75) Inventor: Masayuki Hori, Fukushima (JP)

(73) Assignee: Denon, Ltd., Tokyo (JP)

( * ) Notice: Subject to any disclaimer, the term of this patent is extended or adjusted under 35 U.S.C. 154(b) by 0 days.

(21) Appl. No.: 09/527,246

(22) Filed: Mar. 17, 2000

(30) Foreign Application Priority Data

Aug. 10, 1999 (JP) ............................................. 11-226233

(51) Int. Cl.$^7$ ............................................. G11B 33/02
(52) U.S. Cl. ..................... 369/75.1; 369/30.27; 369/83; 360/137
(58) Field of Search ............................. 369/75.1, 30.27, 369/83, 4, 30.05; 360/137, 71, 73.05, 13, 73.08; 386/70, 81, 52, 69, 23; 200/336

(56) References Cited

U.S. PATENT DOCUMENTS

| | | | |
|---|---|---|---|
| 4,786,982 A | | 11/1988 | Wakahara et al. |
| 5,187,630 A | | 2/1993 | MacKay et al. |
| 5,321,677 A | * | 6/1994 | Kamijima ................. 369/30.27 |
| 5,351,161 A | | 9/1994 | MacKay et al. |
| 6,608,965 B1 | * | 8/2003 | Tobimatsu et al. ............. 386/52 |

FOREIGN PATENT DOCUMENTS

| | | | |
|---|---|---|---|
| EP | 0 805 468 | | 4/1997 |
| EP | 1081694 | * | 3/2001 |
| JP | 11-111118 | | 4/1999 |

OTHER PUBLICATIONS

XP002136656, Photocopies of the Elektra 56 Valve Radio form Normende (control knobs).
Patent Abstracts of Japan, vol. 1999, No. 09, Jul. 30, 1999 of JP 11 110848 A (Sony Corp), Apr. 23, 1999.
Patent Abstracts of Japan, vol. 1999, No. 09, Jul. 30, 1999 of JP 11 111118 A (Sony Corp), Apr. 23, 1999.
Patent Abstracts of Japan, vol. 015, No. 140, (p. 1188), Apr. 9, 1991 of JP 03 017850 A (Hitachi Ltd), Jan. 25, 1991.
Patent Abstracts of Japan, vol. 015, No. 446, (p. 1274), Nov. 13, 1991 of JP 03 187045 A (Sony Corp), Aug. 15, 1991.
Patent Abstracts of Japan, vol. 015, No. 220, (p. 1211), Jun. 5, 1991 of JP 03 062347 A (Sanyo Electric Co Ltd), Mar. 18, 1991.
Patent Abstracts of Japan, vol. 1997, No. 03, Mar. 31, 1997 of JP 08 287779 A (Mic Electron Co), Nov. 1, 1996.

* cited by examiner

Primary Examiner—Ali Neyzari
(74) Attorney, Agent, or Firm—Dickstein Shapiro Morin & Oshinsky, LLP

(57) ABSTRACT

An optical disk apparatus comprising a control dial unit having a jog dial and a shuttle dial which is concentrically mounted outside the jog dial is provided to solve the problem that when operating the jog dial, the shuttle dial in proximity of the jog dial is also rotated thereby preventing its optical pickup to access to a precise target position to be reproduced. The control dial of the invention is comprised of an outer control dial and an inner control dial which has a smaller diameter than the outer control dial and is arranged within a circumference of the outer control dial, wherein a peripheral corner of an upper surface of the inner control dial protrudes from an upper surface of the outer control dial, and its distance of protrusion is larger than 2 mm and smaller than 90 mm.

6 Claims, 3 Drawing Sheets

CONTROL DIAL AND OPTICAL DISK APPARATUS HAVING THE CONTROL DIAL

BACKGROUND OF THE INVENTION

The present invention relates to a control dial for controlling reproduction operation of an optical disk apparatus and an optical disk apparatus having the control dial.

There are optical disk apparatus which are provided with a control dial which include a jog dial and a shuttle dial which are used for editing video data or the like. For example, one of such apparatus is disclosed in JPA No.11-111118.

Generally, in this control dial, its jog dial and shuttle dial are arranged coaxially with concentrical axes of rotation. Further, its control dial in which its shuttle dial is arranged externally outside the periphery of its jog dial is provided on a front panel of the optical disk apparatus.

Directions of traverse of an optical pickup, which traces tracks on an optical disk in search of information for reproduction, can be changed by changing a direction of rotation of the shuttle dial. The optical disk apparatus can execute a rapid forward or reverse direction search. By changing angles of rotation of the shuttle dial, a speed of traverse of the optical pickup over the tracks can be expedited such that the optical disk apparatus reaches faster in the vicinity of a target position which is being searched for its reproduction.

The jog dial has a dent which is provided on its upper surface at a position offset from the center thereof for allowing the user to rotate the jog dial by placing his/her forefinger in this dent.

When the jog dial is rotated, a pulse is output from a rotary encoder, which is connected with the jog dial. The optical pick up is moved in response to the number of pulses, for example, at a rate of one frame per pulse, to search a position of the target of recorded information which is to be reproduced. Although its speed of search is slower than the speed of search by the shuttle dial, it can search more precisely the position of the target of the recorded information, which is to be reproduced.

Therefore, by combination of the both advantages of the shuttle dial and the jog dial, the position of the recorded information to be reproduced can be searched faster and more precisely.

In the above-mentioned optical disk apparatus provided with the shuttle dial and the jog dial, when rotating its jog dial by placing the forefinger on the dent thereof in order to determine the position of the target of recorded information to be reproduced, there often occurs an excess movement of the jog dial, thereby taking too much time in searching of the precise position of the target to be reproduced.

Further, because the position of the dent thereof is not always at a preferred position, which is easy for the forefinger to operate, operability thereof is often impaired.

Therefore, it is contemplated to control the jog dial first by resting the wrist of the user on a control panel board in the vicinity of the jog dial thereby limiting motion of the wrist, then by adjusting the jog dial exclusively by motion of the forefinger which is placed at a peripheral corner of the upper surface of the jog dial, thereby enabling a rapid and precise searching of the position of the target of the recorded information to be reproduced.

However, there occurs such a problem that when the jog dial is operated by the forefinger that is placed at the peripheral corner of the upper surface of the jog dial, the forefinger easily makes contact also with the shuttle dial which is arranged outside the jog dial in proximity thereof thereby unintentionally moving the shuttle dial together with the jog dial, and thereby rendering it difficult to achieve a faster and precise positioning of the optical pickup at the position of the target of recorded information which is desired to be reproduced.

THE SUMMARY OF THE INVENTION

The present invention is contemplated to solve the above-mentioned problems associated with the prior art.

An object of the present invention is to provide for an optical disk apparatus which features a unique structure of a control dial which ensures for its jog dial to be adjusted by motion of the forefinger of the user without touching the shuttle dial which is disposed outside the jog dial and in proximity thereof thereby eliminating erroneous motion thereof, and also ensures that a faster and precise positioning is achieved for its optical pickup at the position of a target of recorded information to be reproduced.

BRIEF DESCRIPTION OF THE DRAWINGS

The other objects and advantages of the invention will becomes more apparent taken with the accompanying drawings, in which:

FIGS. 2A and 2B show a jog dial under adjustment with a forefinger according to the one preferred embodiment of the invention, wherein FIG. 2A is a plan view, and FIG. 2B is a side view; and FIGS. 3A and 3B show a shuttle dial under adjustment with a thumb and forefinger according to the one preferred embodiment of the invention, wherein FIG. 3A is a plan view and FIG. 3B is a side view.

PREFERRED EMBODIMENT

An optical disk apparatus according to one preferred embodiment of the invention will be described with reference to the accompanying drawings in the following.

Figure 1:
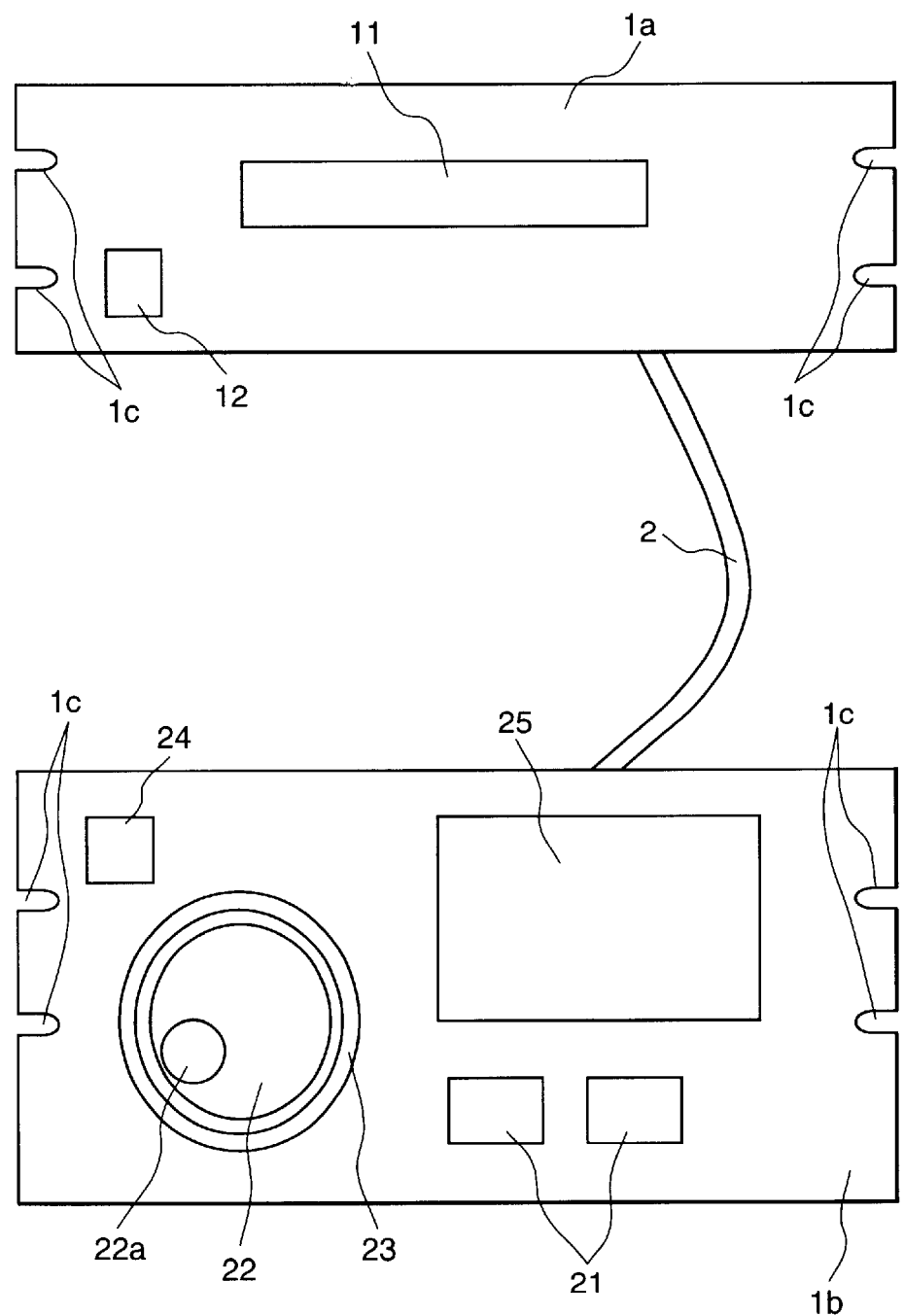
FIG. 1 is a schematic block diagram showing an optical disk apparatus according to one preferred embodiment of the invention.

FIG. 1 is a schematic block diagram indicating the optical disk apparatus of the invention.

Optical disk apparatus 1 in FIG. 1 is comprised of a main body 1*a* and a control device 1*b* thereof which is connected to the main body 1*a* via a control line 2, for controlling the operation of the main body 1*a*.

Main body 1*a* and control device 1*b* thereof have mounting opening 1*c* provided in their front panels for mounting in a rack (not shown).

The main body 1*a* has: a loading tray 11 for loading an optical disk; a reproduction unit (not shown) for reproducing information which is recorded in the optical disk which is loaded through the loading tray and mounted on a turn table via an optical pickup; an output terminal (not shown) for outputting an audio signal which is reproduced by the reproduction unit; a control unit (not shown) for controlling the reproduction unit; and a power switch 12.

Control device 1*b* has control buttons 21 for starting or stopping reproduction; control dial; control button 24 for turning on and off operation of the control dial; and a display 25. The control dial include an internal control dial 22 and an external control dial 23. In this embodiment of the invention, the internal control dial is referred to as jog dial 22, and the external control dial is referred to as shuttle dial 23.

Jog dial 22 has a dent 22a which is provided on the upper surface thereof and at a position offset from the center thereof. Mounting his/her forefinger in this dent 22a, the operator rotates jog dial 22 for fine adjustment.

When jog dial 22 is rotated, a rotary encoder 26 which is connected with the jog dial 22 produces a pulse. Then, in response to the number of pulses produced, optical disk apparatus 1 has the optical pickup move to the position of the target of recorded information, which is to be reproduced, at a rate of one frame per pulse. Therefore, the optical disk apparatus 1 of the invention can search precisely the position of the target of recorded information, which is to be reproduced.

A change in the direction of rotation of shuttle dial 23 causes a change in the direction of traverse of the optical pickup which traces the tracks of an optical disk to be reproduced. The optical disk apparatus can execute rapid searches in the forward or reverse directions. A change in the angle of rotation of the shuttle dial causes a change in the speed of traverse of the optical pickup over the tracks. Therefore, the optical disk apparatus can access quickly to the vicinity of a search point, which is the target of recorded information to be reproduced.

Sequential steps of operation for determining a precise position of a target of recorded information to be reproduced by means of jog dial 22 and shuttle dial 23 will be described in the following.

The user carries out searching of the precise position of the target of recorded information to be reproduced by executing the following steps of operation.

(Step 1): an approximate search of an approximate position of a target of recorded information to be reproduced is carried out by operating shuttle dial 23, (Step 2): a proximity search of a proximity position of the target of recorded information to be reproduced is carried out by operating jog dial 22 wherein the user places his/her forefinger in the dent 22a on jog dial 22, and (Step 3): resting his/her hand (wrist) on a control panel in the vicinity of jog dial 22 thereby limiting motion of the wrist, placing his/her forefinger 31 at a peripheral corner 22b of the upper surface of jog dial 22, and finely controlling the position of the optical pickup by motion of the forefinger, the optical pickup can arrive at the precise position of the target of recorded information to be reproduced.

With reference to FIGS. 2 and 3, jog dial 22 and shuttle dial 23 of the control device 1b according to the invention will be described more specifically in the following.

Control device 1b is mounted on a rack arranged horizontally with its jog dial 22 and shuttle dial 23 facing upward.

Figure 2A:
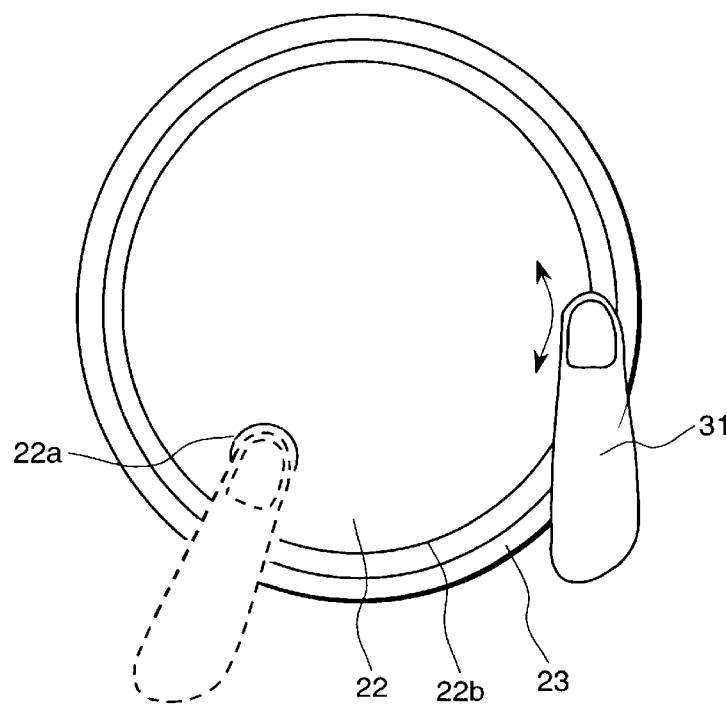

FIG. 2A is a schematic diagram indicating a positional relation between the jog dial and the forefinger when operating the jog dial. In FIG. 2A, the user rotates jog dial 22 in one direction by motion of forefinger 31 which is placed on dent 22a (indicated by dotted lines) in order to move the optical pickup to the proximate position of the target of recorded information to be reproduced.

When the optical pickup is moved to the proximate position of the target of recorded information to be reproduced, placing his/her wrist on the control panel in the vicinity of jog dial 22 thereby limiting the motion of wrist, positioning forefinger 31 at the peripheral corner 22b of the upper surface of jog dial 22, and finely controlling the position of the optical pickup by motion of the forefinger, the optical pickup can arrive at the precise position of the target of recorded information to be reproduced.

Figure 2B:
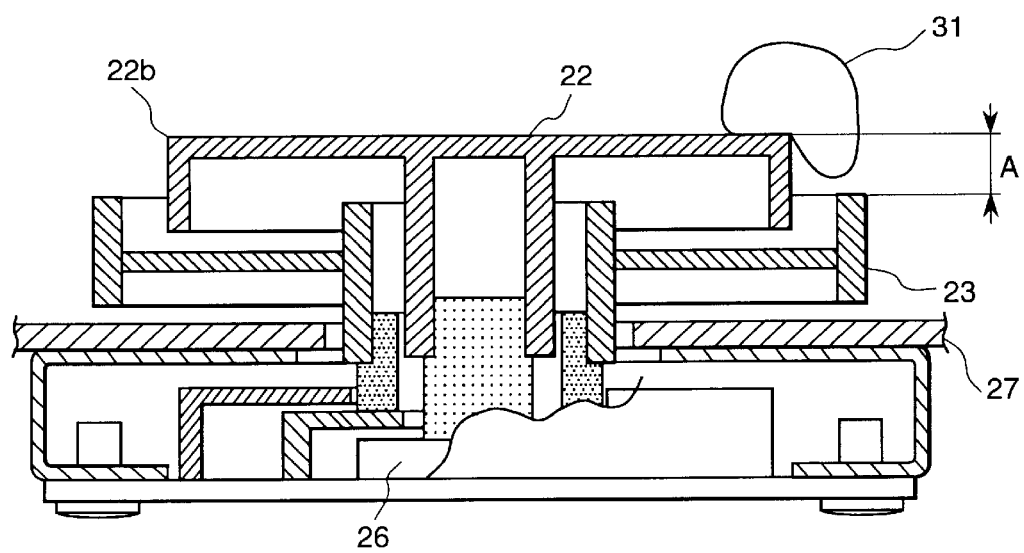

Now, with reference to FIG. 2B, when the user places his/her forefinger 31 at the peripheral corner 22b of the upper surface of the jog dial 22, a portion of the bulb of the forefinger 31 which extends outward from the peripheral corner suspends downward therefrom approximately by 2 mm.

When executing searching of the position of the target to be reproduced through operation of jog dial 22, in order to assure for the forefinger 31 not to make contact with shuttle dial 23 which is disposed outside jog dial 22, dimension A which is a distance between the peripheral corner 22b of the upper surface of jog dial 22 and an upper surface of shuttle dial 23 is set to be at least 2 mm.

Further, in consideration of operation of jog dial 22 with forefinger 31 by resting the wrist of the user on control panel 1b or on a front panel 27 of another device mounted on the rack, the first and the second knuckle of the forefinger 31 are mainly used in forward and reverse motion thereof.

A height of the second knuckle of forefinger 31 from the position of the wrist placed on the front panel is approximately 100 mm, therefore, a height of the peripheral corner 22b of the upper surface of jog dial 22 from the front panel is approximately 100 mm at largest.

Because a height from the front panel to the upper surface of shuttle dial 23 is approximately 10 mm, dimension A will be about 90 mm or less.

Figure 3A:
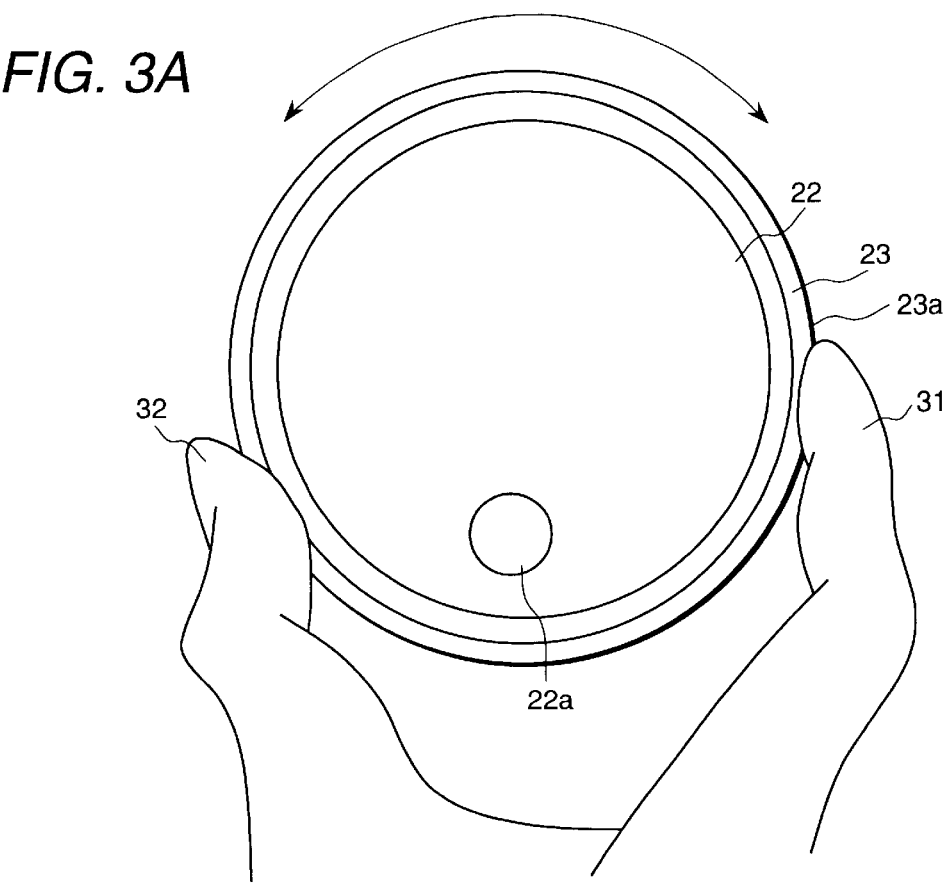
Figure 3B:
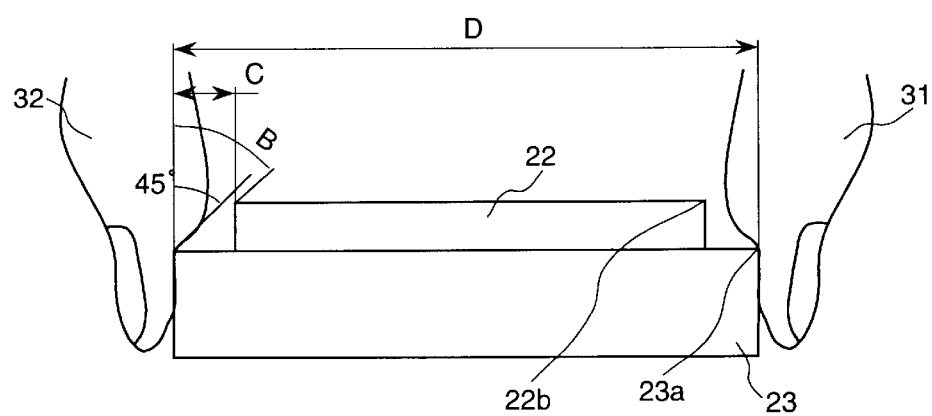

FIGS. 3A and 3B are schematic diagrams indicating a positional relation between the shuttle dial, forefinger and thumb during operation of the shuttle dial according to the present invention.

With reference to FIG. 3A, when operating shuttle dial 23 which has a small diameter D that can be gripped between two fingers, shuttle dial 23 is gripped between thumb 32 and forefinger 31 or middle finger to be operated.

When operating shuttle dial 23 having a large diameter D that cannot be gripped between thumb 32 and forefinger 31 or middle finger, by pressing forefinger 31 or middle finger on a upper corner 23a of the side wall of shuttle dial 23, the user can operate the shuttle dial 23.

When shuttle dial 23 is operated by being gripped between thumb 32 and forefinger 31 or middle finger, or when the shuttle dial 23 is operated with the forefinger 31 or middle finger pressed on an upper corner 23a of the side wall of shuttle dial 23, these fingers are placed on the upper corner 23a of the side wall of shuttle dial 23 as indicated in FIG. 3B. Therefore, a portion of the bulb of these fingers placed on the upper corner 23a, however, which is inside of the upper corner 23a at off-position therefrom will hang over a upper corner 23a of shuttle dial 23 at an angle of approximately 45 degrees.

In order to ensure for thumb 32, forefinger 31 or the middle finger not to make contact with jog dial 22 while operating shuttle dial 23, as indicated in FIG. 3B, it is preferable to arrange such that angle B between a line which is drawn from the peripheral corner 22b of upper surface of jog dial 22 to upper corner 23a of the side wall of shuttle dial 23 and a vertical line which is drawn from the side wall of shuttle dial 23 in an upper direction intercrossing with the above-mentioned line becomes greater than 45 degrees, and that a distance C in radii between shuttle dial 23 and jog dial 22 is determined to render its angle B greater than 45 degrees.

In the case where dimension A indicated in FIG. 2B is 2 mm, in order for angle B indicated in FIG. 3B to become greater than 45 degrees inclusive thereof, preferably dimension C is at least 2 mm or more.

By setting dimensions of jog dial 22 and shuttle dial 23 in such conditions as described above, it is ensured that when the user operates jog dial 22 with forefinger 31 placed on the peripheral corner 22b of the upper surface of jog dial 22, the bulb of the forefinger 31 is prevented from touching shuttle dial 23 which is arranged external of jog dial 22.

Thereby, it is ensured for the user not to move shuttle dial 23 together with jog dial 22 during exclusive operation of jog dial 22.

Thereby, the optical disk apparatus according to the invention, which can move its optical pickup rapidly to the precise position of the target of recorded information to be produced, is provided.

In this embodiment of the invention, jog dial 22 and shuttle dial 23 may have a color, which is different from each other for visual distinction. Shuttle dial 23 having a more eye-catching color than jog dial 22 will help draw visual attention.

The feature of the invention resides in that the user can operate the jog dial by motion of the forefinger which is placed at the peripheral corner of the upper surface of the jog dial without contacting the shuttle dial at all, thereby ensuring for the shuttle dial not to be moved together with the jog dial, and thereby providing for the optical disk apparatus which can traverse its optical pickup to the precise position of the target of recorded information to be reproduced.

What is claimed is:

1. An optical disk apparatus comprising an outer control dial and an inner control dial, said inner control dial having a smaller diameter than that of said outer control dial and being arranged within a circumference of said outer control dial, wherein said inner control dial is mounted protruding in an upper direction from an upper surface of said outer control dial such that when operating said inner control dial by motion of a finger which is placed at a peripheral corner of an upper surface of said inner control dial, said outer control dial is ensured to be out of reach of said finger.

2. An optical disk apparatus according to claim 1, wherein a height from the upper surface of said outer control dial to the peripheral corner of the upper surface of said inner control dial is in a range from 2 mm to 90 mm.

3. An optical disk apparatus according to claim 1, wherein said outer control dial and said inner control dial are provided within a control unit which is separated from the main body.

4. An optical disk apparatus comprising a control panel, an outer control dial mounted on said control panel, and an inner control dial having a smaller diameter than that of said outer control dial and being arranged within a circumference of said outer control dial, wherein a peripheral corner of an upper surface of said inner control dial protrudes in an upper direction from an upper surface of said outer control dial, and wherein a height from the upper surface of said outer control dial to the peripheral corner of the upper surface of said inner control dial is at least 2 mm, and a height from an upper surface of said control panel to the peripheral corner of the upper surface of said inner control dial is less than 100 mm.

5. An optical disk apparatus according to claim 4, wherein said control panel, said outer control dial and said inner control dial are provided within a control unit which is separate from the main body.

6. An optical disk apparatus according to claim 1, wherein said inner control dial is a jog dial which moves a optical pickup according to a predetermined distance in response to an angle of rotation thereof, and said outer control dial is a shuttle dial which changes a distance of traverse of the optical pickup in response to an angle of rotation thereof.

* * * * *